United States Patent [19]
Janssen et al.

[11] 3,746,060
[45] July 17, 1973

[54] CONNECTING OF CONDUIT TERMINALS ON TRAVELING MARINE VESSELS

[75] Inventors: Hans Georg Janssen; Gunter Ecke; Friedmar Wiese, all of Bremerhaven, Germany

[73] Assignee: Aktien-Gesellschaft "Weser", Bremen, Germany

[22] Filed: June 24, 1971

[21] Appl. No.: 156,291

[30] Foreign Application Priority Data
June 26, 1970 Germany.................. P 20 31 672.7

[52] U.S. Cl..................... 141/387, 14/71, 137/615, 141/279, 141/284
[51] Int. Cl............................ B65b 3/04, B67c 3/00
[58] Field of Search..................... 14/71 X; 114/230, 114/235 R; 137/236, 236 OS, 615; 141/279, 284, 387, 388; 182/51, 52; 214/12–14

[56] References Cited
UNITED STATES PATENTS

| | | | |
|---|---|---|---|
| 3,353,512 | 11/1967 | Mathews et al................ | 114/235 R |
| 2,882,536 | 4/1959 | Jordan........................... | 114/230 X |
| 3,228,051 | 1/1966 | Voase et al..................... | 137/236 X |
| 3,257,985 | 6/1966 | Gloster.......................... | 114/235 R |
| 3,519,036 | 7/1970 | Manning........................ | 137/236 X |
| 1,685,927 | 10/1928 | Miller............................ | 214/13 X |

*Primary Examiner*—Houston S. Bell, Jr.
*Attorney*—Michael S. Striker

[57] ABSTRACT

Each of two marine vessels, which are capable of travelling in line-ahead formation, is provided with one or more conduit terminals for a flowable substance. One of the vessels is further provided with a bridge which is connected to the one vessel at its one end for movement about a horizontal(and/or a vertical)axis so that it can be raised and lowered. The other end of the bridge is provided with a connecting arrangement, preferably a universal joint structure, by means of which it can be connected at will to the other vessel travelling in the wake of the first one. The bridge carries one or more conduits extending longitudinally and provided at their opposite ends with coupling devices by means of which they can be coupled to the conduit terminals on the two vessels so that flowable substance can be transferred from one vessel to the other vessel, and vice versa.

12 Claims, 4 Drawing Figures

Patented July 17, 1973 3,746,060

INVENTORS
HANS GEORG JANSSEN
GUNTER ECKE
FRIEDMAN WEISE

INVENTORS
HANS GEORG JANSSEN
GÜNTER ECKE
FRIEDHAL WEISE

CONNECTING OF CONDUIT TERMINALS ON TRAVELING MARINE VESSELS

BACKGROUND OF THE INVENTION

The present invention relates, generally speaking, to an arrangement for connecting conduit terminals on marine vessels, and more particularly to an arrangement for establishing communication between the conduit terminals on two marine vessels which travel in line-ahead formation.

The transfer of substances, such as fuel or cargo, between two vessels in the open sea, that is outside a harbor or mooring, is already known. For this purpose it is conventional to extend a tow from one to the other vessel, in order for the vessels to be either connected in side-by-side relationship or for the leading vessel to tow or pull the trailing vessel in its wake. Insofar as the connecting of the vessels in side-by-side relationship is concerned, it is well known that this is an expedient which to all intents and purposes can be used only when the vessels are stationary, that is when they are lying dead in the water. A connection of this type while the vessels are travelling is not practicable.

Insofar as the connection of the vessels in line-ahead formation is concerned, with the leading vessel towing the trailing vessel, a certain distance must of course be maintained between the vessels for safety purposes. This, on the other hand, makes it difficult to establish a proper and reliable conduit connection between the vessels because of the relatively long gap which must be bridged. Also, the manner in which such a connection must be established requires that first a line be passed (as by throwing) from one to the other vessel, whereupon a heavy rope is hauled across with the lighter line, and finally a conduit is pulled across from one to the other vessel by means of a winch or the like. This is of course time-consuming and rather an elaborate procedure, aside from the fact that it requires the sea to be relatively calm and the mechanical connection of the vessels by the aforementioned throwing line to be secure. Despite this, and assuming that all these circumstance obtain, it is still only possible in this manner to pass across individual hoses or conduits of relatively small diameter, thereby limiting the possibilities for the transfer of substances.

All of this has had as its result that the connection of vessels in this manner, for the transmission of flowable substance from one to the other vessel, has found use only for supply operations, especially for the fueling of warships or of fishing vessels. A wider application of the basic principle has been precluded by the aforementioned difficulties.

SUMMARY OF THE INVENTION

It is, accordingly, an object of the present invention to overcome the aforementioned drawbacks known from the prior art.

More particularly it is an object of the present invention to provide an arrangement for connecting conduit terminals on two marine vessels which can be utilized while the vessels travel, that is which can be established and released during travel of the vessels.

A further object of the invention is to provide such an arrangement which permits the simultaneous connection of several conduit terminals on one vessel with corresponding terminals on the other vessel, and which makes it possible to utilize connecting conduits of such diameters that the invention can be used by commercial cargo ships for economically feasible transfer of all or part of the cargo of one vessel to another.

It is a further and particular object of the invention to provide such an arrangement which makes it possible to transfer part of the fuel cargo of a tanker vessel to another vessel on the open sea and while both vessels are travelling.

An additional object of the invention is to provide a transfer system transferring flowable substances between marine vessels which travel in line-ahead formation.

In pursuance of the above objects, and of others which will become apparent hereafter, one of the features of the invention resides in an arrangement for connecting conduit terminals of marine vessels travelling in line-ahead formation. This arrangement comprises an elongated bridging structure having two opposite end portions. First connecting means is provided for connecting one of the end portions to one vessel for movement to a position in which the bridging structure extends to the other vessel. Second connecting means connects the other portion to the other vessel, and at least one of these connecting means permits relative independent limited movements of the connected vessels. Conduit means is provided on the bridging structure and extends longitudinally of the same, and coupling means is provided on the spaced end portions of this conduit means and can be coupled with the conduit terminals on the respective vessels.

In view of the fact that the present invention contemplates that the connection between the vessels be established while the vessels are travelling in line-ahead formation, the conduit terminals on one vessel will ordinarily be provided at the stern of the vessel and those on the other vessel will be provided at the bow thereof. The conduit terminals themselves of course communicate with suitable compartments or the like of the respective vessels, that is if one vessel is a tanker they will communicate with the fuel cargo hold, and if the other vessel is a ship which is to take on fuel from the tanker for its own use, then its conduit terminals will communicate with its fuel tanks. This is of course only by way of explanation and example, because depending upon the type of substance to be transferred from one to the other vessel, it is evident that the conduit terminals may be in communication with other compartments on the respective vessels.

In any case, it is important according to the present invention that the bridging structure serves not only as a carrier for the conduit means which can be connected in communicating relationship with the conduit terminals on the respective vessels, but also at the same time provides for a mechanical substantially in-elastic connection of the two vessels, as seen with respect to the longitudinal direction of the vessels, that is to the direction of travel thereof. Also, the bridging structure may be so configurated according to a further concept of the invention that it can be used for personnel to move from one to the other ship or vessel, and in particular it may be provided with railings or the like.

The conduit means carried by the bridging structure may be in the form of rigid conduits, flexible conduits, a combination of these, or a combination of rigid and flexible conduits with suitable other components as may be necessary. If individual conduits are used, flange connections may advantageously be provided for connecting the opposite end sections of the conduits with the conduit terminals on the respective vessels.

It is also advantageous that the bridging structure be mounted at the bow or the stern of one of the vessels (depending upon whether the conduit terminals are provided at the bow or the stern, it being evident that the bridge will be mounted at that end of the vessel where the conduit terminals are located), being turnable about a transverse axis. On the other hand, the connecting means for connecting the opposite end portion of the bridging structure with the other vessel should permit a relative displacement of the other vessel and the bridging structure ( and therefore the vessel which carries it) in all directions, that is universal movement, so that the two vessels can move independently with reference to one another within a certain limit and range as may be dictated by the prevailing seas.

It is advantageous to mount the bridging structure at the stern of the vessel which is to be the leading vessel in the direction of travel, and to mount it for turning movement about a normally horizontal axis so that it can be raised or lowered by a suitable displacing means, preferably a winding tackle which is connected with the bridging structure and whose rope is connected with the drum of a winch so that, depending upon whether the winch takes up or pace out the rope, the bridging structure will be raised or lowered. The direction in which the bridging structure will move as it is raised and pivots about the horizontal axis, is of course in the longitudinal direction of the vessel in which the bridging structure is mounted. The use of a winch makes it possible to lower the bridging structure so that its free end portion is lowered onto an appropriately configurated coupling component provided at the bow or stern (depending upon the prevailing circumstances) of the second vessel, or can be lifted off, as required.

The bridging structure of course serves in this manner not only as a support and carrier for the conduit means, but also as a mechanical connection between the two vessels which can thus travel in connected relationship. To provide for a universal relative displacement of the bridging structure and the trailing or second vessel it is advantageous that the connecting means connecting the bridging structure and the second vessel be in form of or incorporate a universal joint of known construction.

It is conceivable to have the bridging structure not tilted upwardly and downwardly but to have it turn about a normally vertical axis. If, however, the bridging structure is tilted upwardly and downwardly, then it is advantageous that at least the end section or sections of the conduit means which are adjacent the vessel carrying the bridging structure be provided with coupling means or coupling portions whose general plane is so inclined that it is approximately tangential to a circle concentric with the horizontal axis about which the bridging structure pivots. This avoids interference of the coupling means or coupling portions with the vessel carrying the bridging structure, as will be explained subsequently.

In the event that several conduit terminals on one vessel are to be connected with corresponding conduit terminals on the other vessel via several conduits carried by the bridging structure, it is advantageous to utilize turnable connectors between the conduit terminals on the respective vessels and the associated end sections of the conduits on the bridging structure, permitting turning movements about vertical axis without necessitating that the conduits or conduit terminals themselves be capable of movement. Such connectors are already known per se from the art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
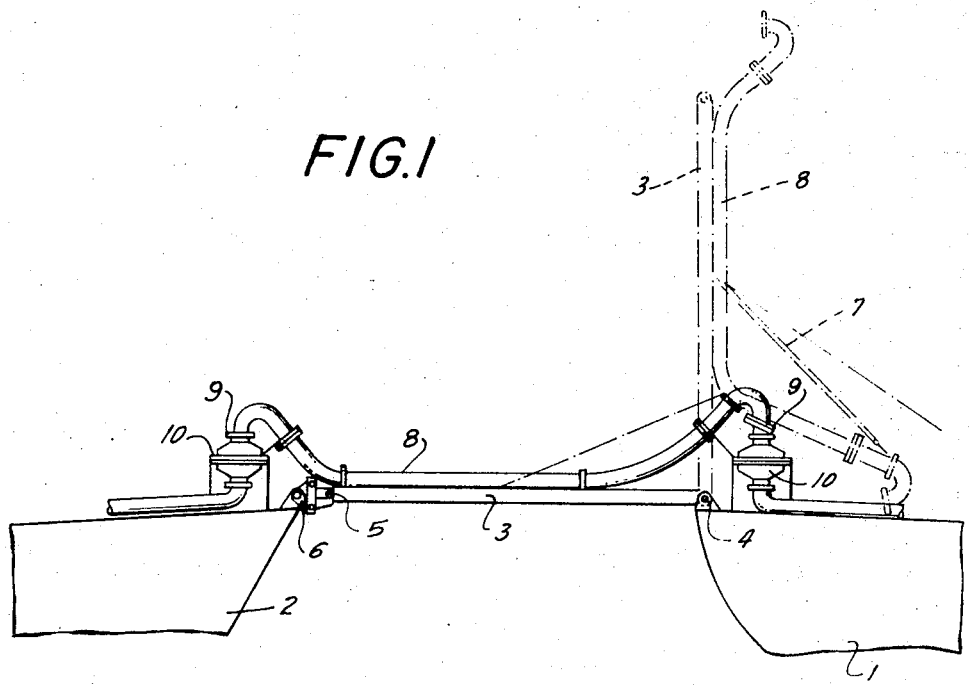
FIG. 1 is a fragmentary simplified side view illustrating one embodiment of the invention.
Figure 2:
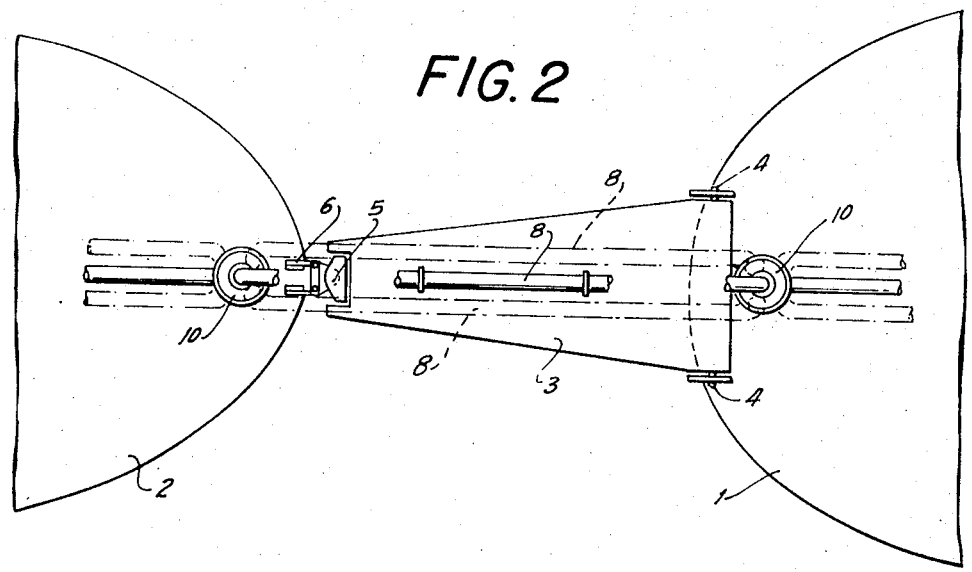
FIG. 2 is a top-plan view of FIG. 1.
Figure 3:
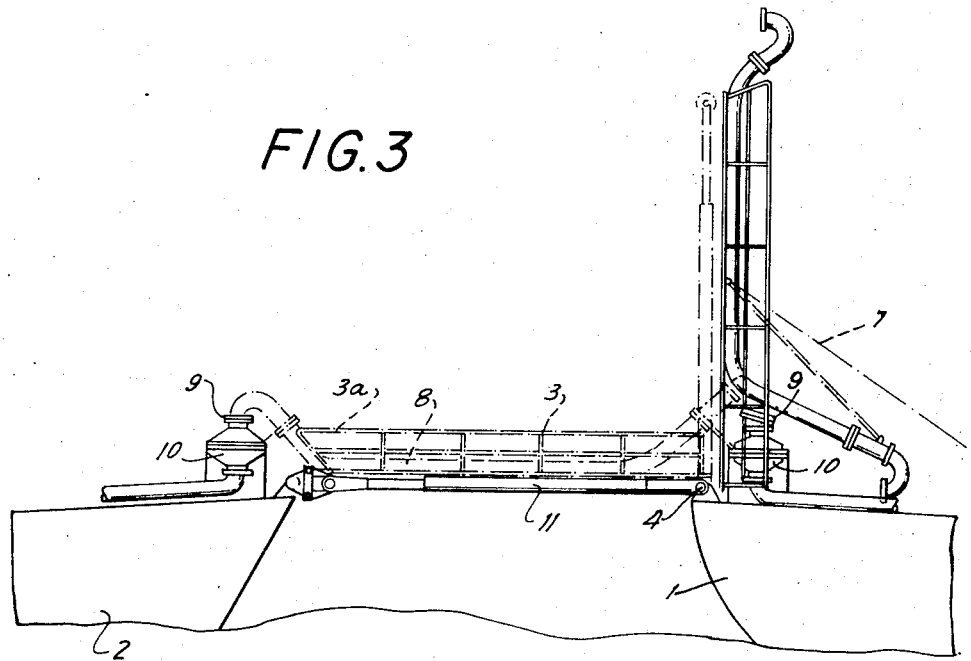
FIG. 3 is a view similar to FIG. 1 but illustrating a further embodiment of the invention.
Figure 4:
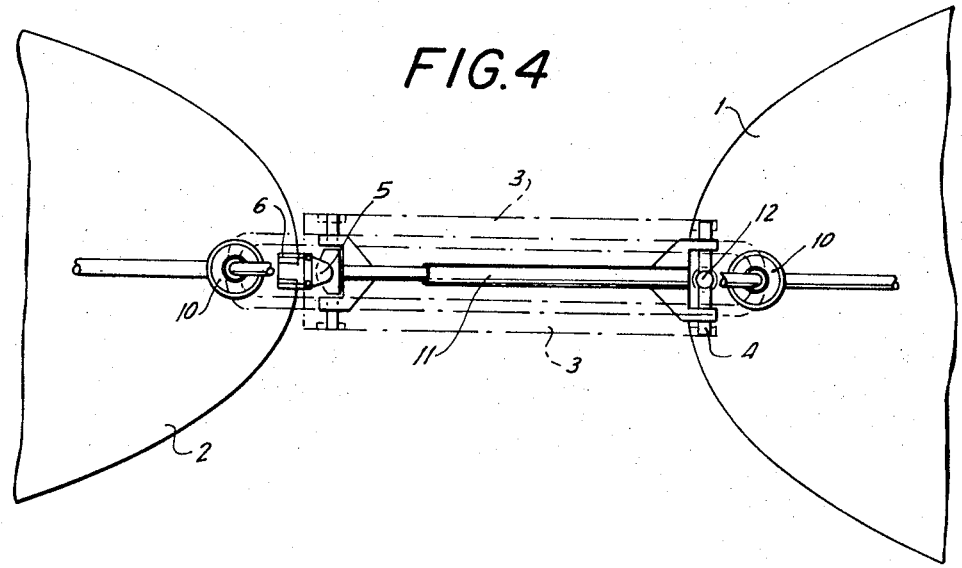
FIG. 4 is a top-plan view of FIG. 3.

Before entering into a detailed discussion of the drawings it is pointed out that in both embodiments, namely that of FIGS. 1 and 2 on the one hand and that of FIGS. 3 and 4 on the other hand, it is always assumed that the vessel shown at the right-hand side of the respective Figure will move towards the right as it travels, with the vessel at the left-hand side following it in line-ahead formation.

For purposes of explanation it is further assumed that the right-hand vessel 1 is a larger tanker and the left-hand vessel 2 is a smaller tanker which is to receive a portion of the fuel cargo of the tanker 1. According to the present invention there is provided an arrangement having a bridging structure 3 which may be constructed as a platform, utilizing suitable profile beams or the like with coverings of any desired type. The bridging structure 3 is connected with one of its end portions to the stern of the vessel 1 in suitable mountings for pivotal or turning movement about a normally horizontal axis 4 from the operative full-line position to the inoperative broken-line position in FIG. 1. The free end portion of the bridging structure 3 carries a connecting device, for instance a universal joint 5, which when connected with the bow of the vessel 2, permits relative movement of the vessel 2 and the bridging structure 3 (and therefore the vessel 1) in all directions. The vessel 2 is provided at its bow with a suitable anchoring device, here shown as a two-part anchoring device 6 (compare FIG. 2) by means of which the vessel 2 can be connected with the universal joint 5.

To displace the bridging structure 3 between its operative and inoperative positions it is advantageous to provide a winding tackle 7 connected with the bridging structure 3 and provided in conventional manner with a rope or the like which is connected with a non-illustrated winch so that the bridging structure 3 can be displaced between its positions without requiring manual operation. Depending upon whether the winch pays out or takes up the rope of the winding tackle 7, the bridging structure will be lowered to the full-line position or raised to the broken-line position.

Depending upon the requirements of the individual case, the bridging structure 3 is provided with one or more (three illustrated in FIG. 2) conduits 8 which may be a variously configurated, for instance they may be rigid, they may be flexible or they may be configurated of a combination of rigid and flexible conduits and possibly also auxiliary components. At the opposite end sections of these conduits 8 there are provided coupling elements 9 which mate with cooperating coupling elements on the respective vessels 1 and 2, these cooperating coupling elements being provided at the conduit terminals which are located on the vessel 1 at the stern and on the vessel 2 at the bow thereof.

It is advantageous that at least the coupling elements on the conduit terminals of the vessel 1 and on the end section of the conduits 8 which are associated with these coupling elements, be so arranged that their general planes are inclined to extend approximately tangentially with reference to a circle concentric with the pivot axis 4. The purpose of this is to avoid interference of the coupling elements with the displacement of the bridging structure 3 between its positions.

When several conduits 3 are provided for connection with several conduit terminals on each of the vessels 1 and 2, as shown in FIG. 2, then it is advantageous to provide multi-chamber rotary connectors 10 which are each turnable about a vertical axis and which can be configurated in known manner forming no part of the present invention.

It will be appreciated from the manner in which the bridging structure 3 is displaced from its inoperative broken-line position (see FIG. 2) to its operative full-line position, that a connection between the bridging structure 3 and the vessel 2 can utilize with particular advantage such connecting elements which are engaged when the bridging structure 3 is lowered to its full-line position and which are disengaged when it is raised to its broken-line position. A particularly simple construction might utilize a projection at the bow of the vessel 2 and an eye on the bridging structure 3 which would receive the projection. Another possibility would be a reversal of this arrangement, or a ball and socket connection reminiscent of trailor hitches.

The embodiment in FIGS. 3 and 4 is substantially the same as that in FIGS. 1 and 2, except for some differences. Like elements are identified with like reference numerals as in the preceding embodiment. In addition to the bridging structure 3 the embodiment in FIGS. 3 and 4 utilizes a separate arm 11 which when this embodiment is mounted on the shaft defining the horizontal pivot axis 4 for the bridging structure 3 (the latter is shown in broken lines in FIG. 4). Advantageously the arm will be a hydraulically telescopable arm, although other possibilities exist also, but in any case it should be pivotable about the axis 4 independently of the bridging structure 3. The purpose of the arm 11 is to provide initially a mechanical connection between the vessels 1 and 2, and when such mechanical connection is established the bridging structure 3 can then be lowered to its operative position. Making the arm telescopable permits an engagement of the vessels 1 and 2 with one another and then to move the vessels with reference to one another until they are at the necessary spacing at which the bridging structure 3 can become engaged with the connecting means on the vessel 2 when moved to operative position.

In order to permit accommodation to some horizontal displacement of the vessels 1 and 2 it is advantageous, but not absolutely necessary, to mount the mounting arrangement in which the bridging structure 3 is journalled for displacement about the pivot axis 4, be itself so mounted that it can be turned about a normally vertical axis 12. However, when this is done it is necessary that lateral guide means be provided, or for instance two winding tackles 7, which guide and hold the bridging structure 3 to prevent excessive lateral displacements. FIG. 3 also shows that the bridging structure 3 may be provided with one or more lateral railings 3a in order to make it possible for personnel to pass via the bridging structure 3 from one of the vessels to the other.

It will be understood that each of the elements described above, or two or more together, may also find a useful application in other types of constructions differing from the types described above.

While the invention has been illustrated and described as embodied in specific exemplary embodiments, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claim:

1. A transfer system for transferring flowable substances between marine vessels travelling in line-ahead formation, comprising a first and a second marine vessel capable of travelling in line-ahead formation; a first and a second conduit terminal for flowable substances on said first and second vessel, respectively; an elongated rigid bridging structure having two end portions; first connecting means connecting one of said end portions to said first vessel for movement of said bridging structure to and from a position in which it extends to said second vessel; second connecting means including jointed means for connecting the other of said end portions to said second vessel with freedom of limited relative displacement of said second vessel and bridging structure but for transmission of pressures and tensile forces between said vessels via said bridging structure while said vessels remain spaced apart by a distance which is determined by the length of said bridging structure; conduit means mounted on said bridging structure extending longitudinally of the same and having spaced end sections located in the region of the respective end portions; and coupling means on said end sections and said conduit terminals, respectively, for mating engagement in a sense connecting the conduit terminals of said vessels via said conduit means so as to permit transfer of flowable substances between said vessels through said conduit means without danger of damage to the latter and to said coupling means due to the stress-transmitting connection of said vessels via said bridging structure.

2. An arrangement for connecting conduit terminals on two marine vessels travelling in line-ahead formation, comprising an elongated rigid bridging structure having two opposite end portions; first connecting means for connecting one of said end portions to one vessel for movement relative to the same to and from a position in which said bridging structure extends to the other vessel; second connecting means for connecting the other of said end portions to said other vessel so that pressures and tensile forces can be transmitted between said vessels via said bridging structure while said vessels remain spaced apart by a fixed distance determined by the presence of said bridging structure, at least one of said connecting means comprising jointed means for permitting relative independent limited movements of the connected vessels; conduit means mounted on said bridging structure extending longitudinally of the same and having spaced end sections in the regions of the respective opposite end portions of said bridging structure; and coupling means on said end sections for coupling the same with the respective conduit terminals on said vessels so as to permit the transfer of flowable material between said vessels through said conduit means without danger of damage to the latter and to said coupling means due to the stress-transmitting connection of said vessels by said bridging structure.

3. An arrangement as defined in claim 2, wherein said first connecting means comprises mounting means mounting said bridging structure on said one vessel for pivotal displacement about a transverse axis, and said jointed means connects said other end portions with said other vessel with freedom of universal movement.

4. An arrangement as defined in claim 3, wherein said axis is a normally horizontal axis; and further comprising displacing means for displacing said bridging means about said axis between an inoperative upright position and an operative substantially horizontal position in which it extends from said one to said other vessel.

5. An arrangement as defined in claim 4, said displacing means comprising a winding tackle connected with said bridging structure and including rope means, and a winch on said one vessel and connected with said rope means for taking-up and paying-out of the same so as to displace said bridging means about said axis between said operative and inoperative positions.

6. An arrangement as defined in claim 2, wherein said jointed means means comprises a universal joint.

7. An arrangement as defined in claim 2, said coupling means comprising coupling portions provided on said end sections and adapted to mate with cooperating coupling portions on said conduit terminals.

8. An arrangement as defined in claim 7, said first connecting means being adapted for connecting said one end portion to said one vessel for turning movement of said bridging structure about an axis; and wherein at least said coupling portions on the end sections at said one end portion are located in a general plane which in any position of said bridging structure is substantially tangential to said axis.

9. An arrangement as defined in claim 2, said first connecting means comprising connecting structures for connecting said one end portion to said one vessel with freedom of relative movement about two mutually inclined axes.

10. An arrangement as defined in claim 2, said first connecting means comprising connecting structures for connecting said one end portion to said one vessel with freedom of relative movement about two mutually inclined axes one of which is normally horizontal and the other of which is normally vertical.

11. An arrangement as defined in claim 2; further comprising at least one arm adapted to be connected with said one vessel and displaceable independently of said bridging structure to an engaging position extending to and engaging said other vessel, whereby to enable establishing of a connection between said vessels prior to connecting of said bridging structure between the same.

12. An arrangement as defined in claim 11, said first connecting means comprising a substantially horizontal pivot shaft mounting said bridging structure for movement to said position; and wherein said arm is a hydraulically telescopable arm also mounted on said pivot shaft.

* * * * *